United States Patent
Viegener

(10) Patent No.: US 6,805,385 B2
(45) Date of Patent: Oct. 19, 2004

(54) NON-DETACHABLE PRESS FIT ARRANGEMENT BETWEEN A FITTING AND AN END PORTION OF A METAL PIPE

(75) Inventor: Walter Viegener, Attendorn (DE)

(73) Assignee: Franz Viegener II GmbH & Co. KG, Attendorn (DE)

( * ) Notice: Subject to any disclaimer, the term of this patent is extended or adjusted under 35 U.S.C. 154(b) by 0 days.

(21) Appl. No.: 09/200,179

(22) Filed: Nov. 25, 1998

(65) Prior Publication Data
US 2003/0038481 A1 Feb. 27, 2003

(30) Foreign Application Priority Data
Dec. 10, 1997 (DE) .................................. 297 21 760 U

(51) Int. Cl.[7] ............................................... F16L 13/14
(52) U.S. Cl. ............................ 285/382.2; 285/382.7; 285/340; 285/232
(58) Field of Search .................... 285/382.2, 382.7, 285/340, 104, 282, 339

(56) References Cited

U.S. PATENT DOCUMENTS

| | | | | |
|---|---|---|---|---|
| 2,225,208 A | * | 12/1940 | Crickmer | ................... 285/104 |
| 2,255,673 A | * | 9/1941 | McDermott | |
| 2,341,164 A | * | 2/1944 | Shimek | |
| 3,596,939 A | * | 8/1971 | Gibson | ................... 285/382.2 |
| 3,632,141 A | * | 1/1972 | Larsson | |
| 3,917,324 A | * | 11/1975 | Wakatsuki et al. | ....... 285/382.7 |
| 4,018,462 A | * | 4/1977 | Saka | .......................... 285/111 |
| 4,819,974 A | * | 4/1989 | Zeidler | |
| 4,850,096 A | * | 7/1989 | Gotoh et al. | ......... 285/382.7 X |
| 4,880,260 A | * | 11/1989 | Gotoh et al. | ............. 285/382.2 |
| 5,108,134 A | * | 4/1992 | Irwin | |
| 5,484,174 A | * | 1/1996 | Gotoh et al. | ............. 285/382.2 |
| 5,695,224 A | * | 12/1997 | Grenier | ..................... 285/104 |
| 5,722,702 A | * | 3/1998 | Washburn | ................... 285/340 |

FOREIGN PATENT DOCUMENTS

| | | | | |
|---|---|---|---|---|
| GB | 2177174 | * | 1/1987 | ............. 285/382.7 |
| GB | 2234306 | * | 1/1991 | |

* cited by examiner

Primary Examiner—Daniel P. Stodola
Assistant Examiner—Aaron Dunwoody
(74) Attorney, Agent, or Firm—Barnes & Thornburg, LLP

(57) ABSTRACT

In a non-detachable press fit arrangement between an end portion of a metal pipe and a socket of a fitting, the socket defines an interior space and is formed with an annular anchoring groove which faces the interior space for receiving a sealing ring. The press fit arrangement includes at least one holding element secured to the socket and cold formed together with the socket, whereby the holding element at least partially penetrates the material of the end portion of the metal pipe to realize a positive fit with the metal pipe.

21 Claims, 5 Drawing Sheets

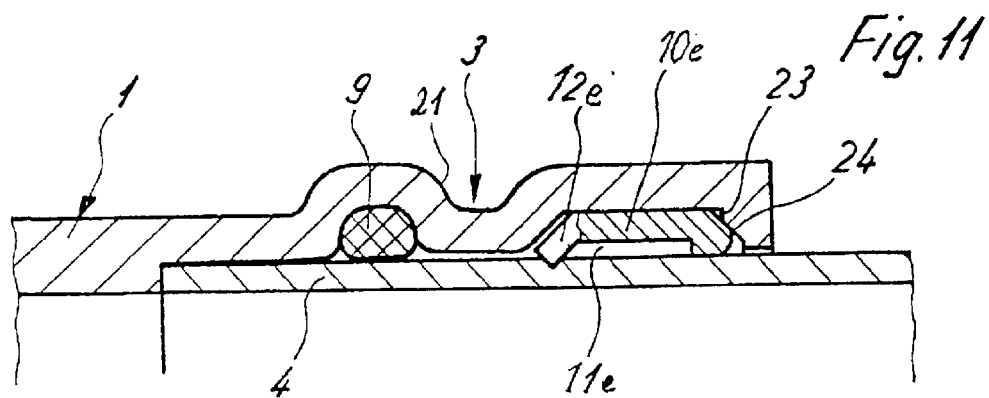
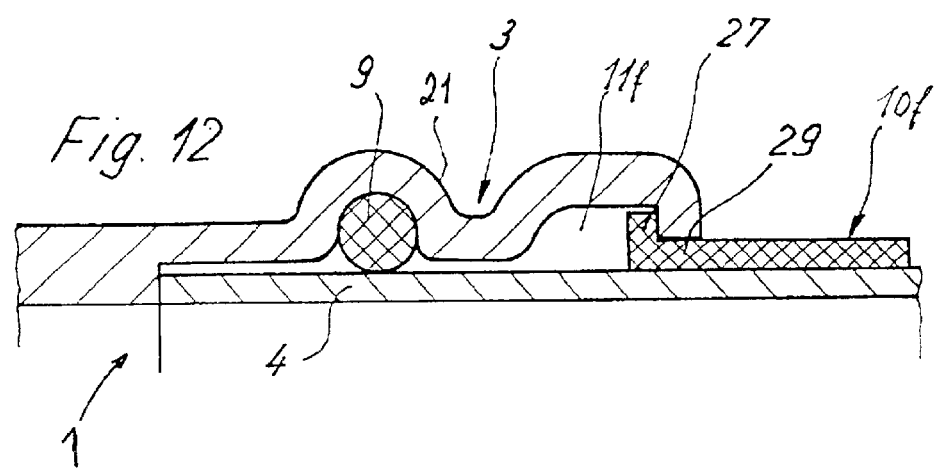
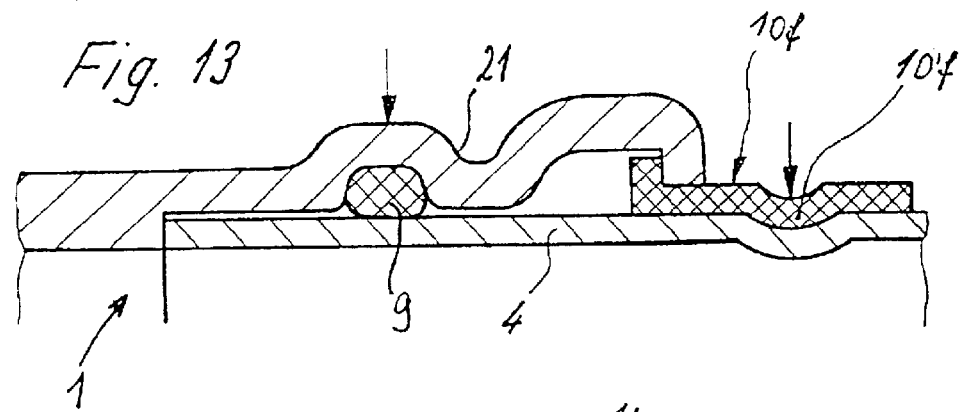
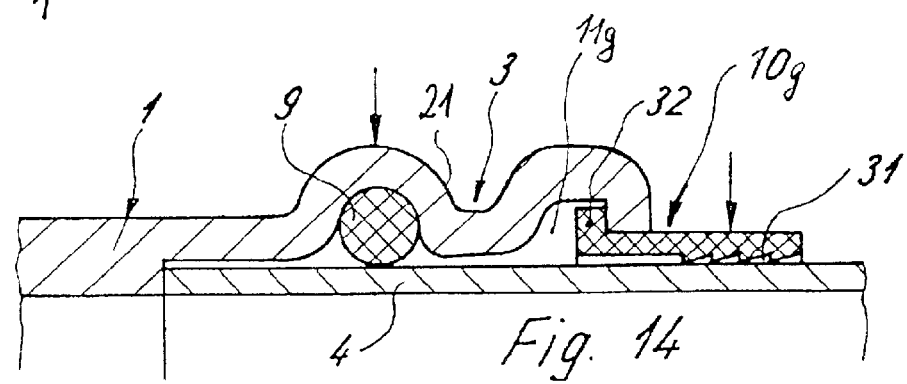

NON-DETACHABLE PRESS FIT ARRANGEMENT BETWEEN A FITTING AND AN END PORTION OF A METAL PIPE

CROSS-REFERENCES TO RELATED APPLICATIONS

This application claims the priority of German Patent Application Serial No. 297 21 760.7, filed Dec. 10, 1997, the subject matter of which is incorporated herein by reference.

BACKGROUND OF THE INVENTION

The present invention relates to a non-detachable, cold-formed press fit arrangement between an end portion of a metal pipe in a socket of a fitting, with the socket formed with an annular anchoring groove facing interiorly of the socket for receiving a sealing ring.

In general, a press fit arrangement between the socket of a fitting and an end portion of a metal pipe up to an inside diameter of 54 mm is realized by an electrohydraulic press tool which is provided with a crimping bracket having two jaws that bound a compression zone. These jaws are swingably mounted to adapters which extend transversely to the longitudinal axis of the bracket. The jaws grab around the socket of the fitting in the area of a bead for receiving the sealing ring and on both sides of the bead. A force is applied immediately before, on and behind the bead to realize a non-detachable joint. Through cold formation of the bead, the sealing ring is pressed onto the pipe end while indentations spaced about the circumference are formed before and behind the bead for plastically deforming the pipe end in the area of the indentations.

When greater diameters of metal pipes are involved, the use of a crimping bracket whose jaws are directly placed over a fitting is inadequate to effect a cold forming operation of the fitting and the inserted end portion of the metal pipe. In order to non-detachably bond pipes with an inside diameter of 70, 80 or 100 mm through cold forming, the use of electrohydraulically operated tools is known which are however bulky and difficult to handle. These tools are provided with a wraparound ring which is placed over the socket of a fitting after inserting the end portion of the metal pipe in the socket. By means of the wraparound ring, the inwardly open bead, which receives the sealing ring, and the area of the socket neighboring the bead together with the pipe portion located in this area are commonly deformed in a triangular shaped manner, whereby the sides of the triangle assume a curved configuration and the corners are rounded.

It is also known to provide the fitting with smooth ends and to produce the bond between one end of the fitting and an end portion of the metal pipe by utilizing a socket in which the end of the fitting and the end portion of the metal pipe are inserted, and which is slotted in longitudinal direction. The width of the slot can be decreased by means of locking screws so that the socket is pressed onto the ends of the fitting and the metal pipe. A seal is placed in the socket for circumscribing the ends of the fitting and the metal pipe.

SUMMARY OF THE INVENTION

It is an object of the present invention to provide an improved press fit arrangement between a fitting and a metal pipe, obviating the afore-stated drawbacks.

In particular, it is an object of the present invention to provide an improved press fit arrangement for use with metal pipes of an inside diameter exceeding 54 mm, which realizes a round or substantially round cross-section of the socket even in the crimped end state whereby the sealing forces and holding forces about the entire circumference are the same or substantially the same.

These objects, and others which will become apparent hereinafter, are attained in accordance with the present invention by providing a socket which is formed with an annular anchoring groove facing inwardly for receiving a sealing ring, and by securing at least one holding element to the socket and cold forming the holding element together with the socket, with the holding element at least partially penetrating the material of the end portion of the metal pipe to realize a positive fit with the metal pipe.

According to one embodiment of the invention, the socket is formed adjacent the anchoring groove for the sealing ring with an annular receiving groove facing the interior space for receiving the holding element, whereby the holding element is provided with projections spaced about the circumference of the holding element and pointing towards the end portion of the metal pipe, or with a circumferential cutting edge extending towards the end portion of the metal pipe. When cold forming the socket of the fitting, the projections or the cutting edge realize the positive fit between the holding element and the end portion of the metal pipe.

The holding element may be a ring formed with an axial slot, with the ring-shaped holding element having a cross section in the form of a vertex of a triangle (or pointed roof configuration), or a curved cross section or a polygonal cross section. It is also possible to configure the receiving groove with a conical base, whereby the holding element has a cross sectional contour which complements the conical base of the receiving groove and includes a free edge of small diameter for penetration into the end portion of the metal pipe after radially compressing the socket.

According to another feature of the present invention, the socket of the fitting may also be provided adjacent the entry opening for the metal pipe with an outwardly directed annular anchoring groove for accommodating an anchoring flange of a sleeve-like holding element.

According to still another feature of the present invention, the anchoring groove is formed in a bead of the socket, with the holding element being a stepped sleeve having a first portion of smaller diameter and a second portion of greater diameter, with the second portion overlapping the bead of the socket, and with the first portion surrounding the metal pipe. After crimping operation, the holding element matches the outer contour of the socket, with the first portion of the stepped sleeve denting the material of the metal pipe.

Suitably, the socket of the fitting has an outer peripheral surface provided with an engagement member in form of a circumferential groove, lobes, ribs or circumferential fins for attachment of a press tool, preferably a wraparound chain.

According to yet another feature of the present invention, the holding element has a hardness exceeding a hardness of the metal pipe. Preferably, the holding element is made of special steel.

A press fit arrangement in accordance with the present invention realizes a positive fit between the holding element, which is secured to the socket of the fitting, and the metal pipe by providing the holding element with spikes, teeth, crawls or cutting edges which dig into the material of the end portion of the metal pipe during crimping operation. It is also possible to provide the holding element in the form of an axially slotted sleeve which surrounds the metal pipe and partially dents the material of the metal pipe.

BRIEF DESCRIPTION OF THE DRAWING

The above and other objects, features and advantages of the present invention will now be described in more detail with reference to the accompanying drawing in which:

FIGS. 8 to 11 are longitudinal sections of press fit arrangements according to the present invention, showing further variations of the type of holding element shown in FIG. 7;

FIG. 12 is a longitudinal section of a press fit arrangement according to the present invention, showing a modified type of holding element and associated receiving groove in the socket, with the holding element projecting outward beyond the area of the socket; and FIGS. 13 to 18 are longitudinal sections of press fit arrangements according to the present invention, showing further variations of the type of holding element shown in FIG. 12.

DETAILED DESCRIPTION OF PREFERRED EMBODIMENTS

Figure 1:
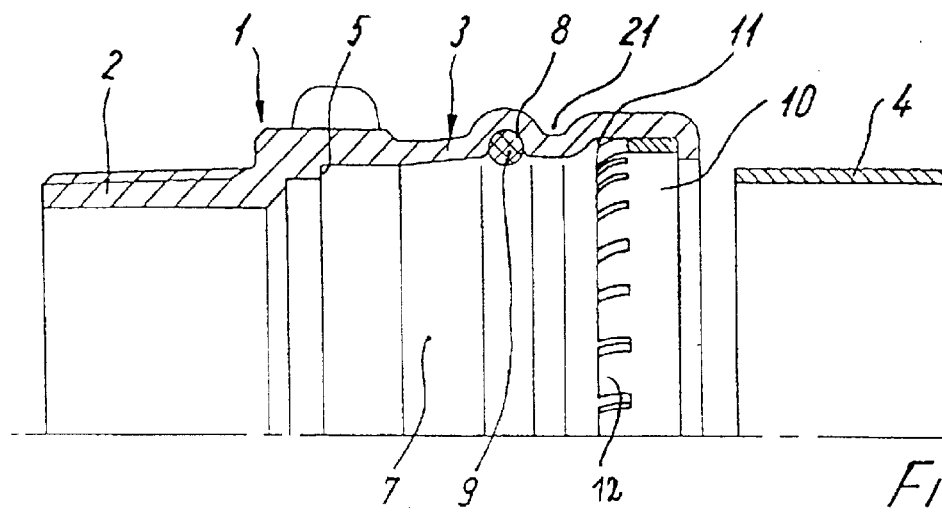
FIG. 1 is a longitudinal section of a press fit arrangement according to the present invention for joining a fitting and an end portion of a metal pipe.

Throughout all the Figures, same or corresponding elements are generally indicated by same reference numerals.

Turning now to the drawing, and in particular to FIG. 1, there is shown a longitudinal section of a press fit arrangement according to the present invention for joining a fitting, generally designated by reference numeral 1 and an end portion 4 of a metal pipe. The fitting 1 includes a spigot 2, which is provided with an external thread for attachment e.g. to another pipe (not shown), and a socket 3 for receiving the pipe end 4. The socket 3 has an inside diameter which corresponds to the outside diameter of the pipe end 4 and is formed interiorly with a circumferential annular stop surface 5 for interaction with an end face 6 of the pipe end 4 to thereby restrict the entry path of the pipe end 4.

The socket 3 defines an interior space 7 and is provided with an anchoring groove 8 which is open towards the interior space 7 for accommodating a sealing ring 9. Positioned near the entry opening for the pipe end 4 at an axial distance to the sealing ring 9, the socket 3 is further provided with a receiving groove 11 for securement of a holding element 10. In the exemplified embodiment of FIG. 1, the holding element 10 is ring-shaped and slotted in longitudinal direction to form a plurality of projections 12 which are spaced about the circumference of the holding element 10 and point in the direction of the pipe end 4. Suitably, the holding element 10 is situated between the sealing ring 9 and the free end of the fitting 1, thereby ensuring that the holding element is prevented from contacting liquid transported under pressure in the metal pipe.

In the non-limiting example of FIG. 1, the sealing ring 9 is formed by an O ring of relatively small cross section; However, it is certainly within the scope of the present invention to provide the sealing ring 9 as lip seal or as matched annular formed body.

The holding element 10 is positively fitted or resiliently installed in the receiving groove 11, whereby a spring-mounted installation of the sealing ring 9 enables a compensation of tolerance deviations between interacting components.

Figure 2:
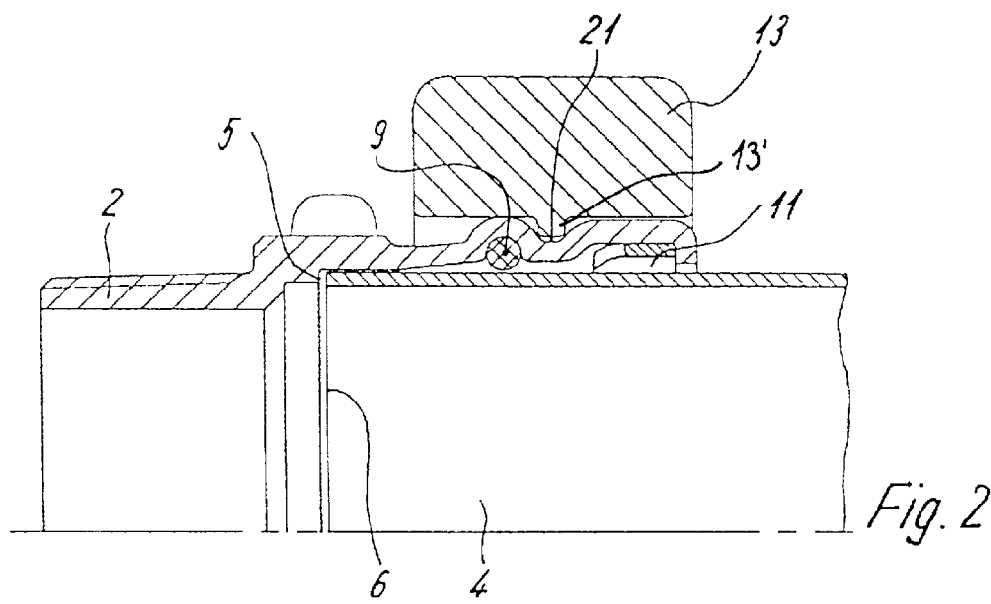
FIG. 2 is a longitudinal section of the press fit arrangement, showing the end portion of the metal pipe inserted in a socket of the fitting and a press tool attached to the socket for carrying out a crimping operation.

After inserting the pipe end 4 through the entry opening of the socket 3 until the end face 6 of the socket 3 impacts the stop surface 5, a press tool 13, shown only schematically in FIG. 2, is attached from outside to the socket 3 for subsequent execution of the crimping operation. Suitably, the socket 3 of the fitting 1 is formed about is outer peripheral surface with a circumferential groove 21 for receiving a complementary rib 13' of the press tool 13, preferably a wraparound chain of the press tool 13. Persons skilled in the art will understand that instead of the described circumferential groove, the socket 3 may also be formed with lobes, ribs or circumferential ridges for cooperation with complimentary components on the press tool 13.

Figure 3:
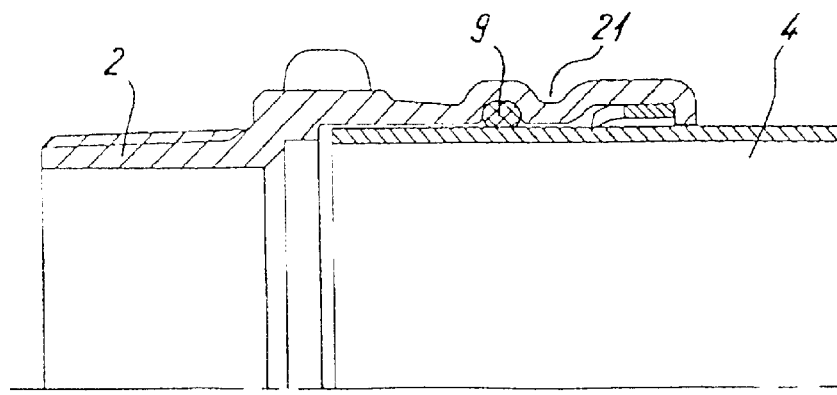
FIG. 3 is a longitudinal section of the press fit arrangement after realizing a non-detachable positive fit between the fitting and the end portion of the metal pipe.
Figure 4:
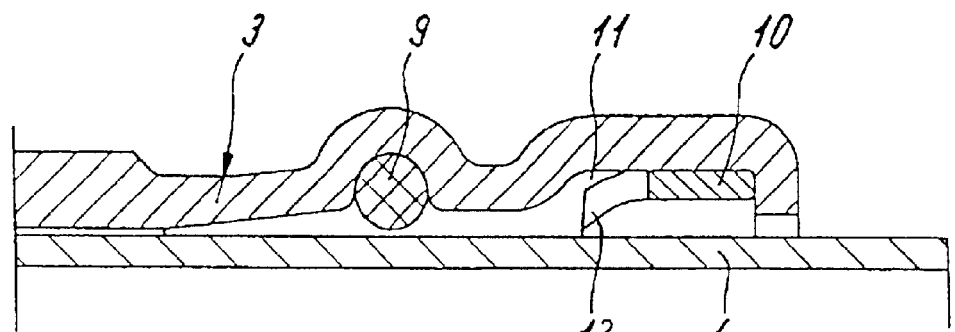
FIGS. 4 to 6 are enlarged sectional views of various stages for realizing a non-detachable positive connection between the fitting and the metal pipe.
Figure 5:
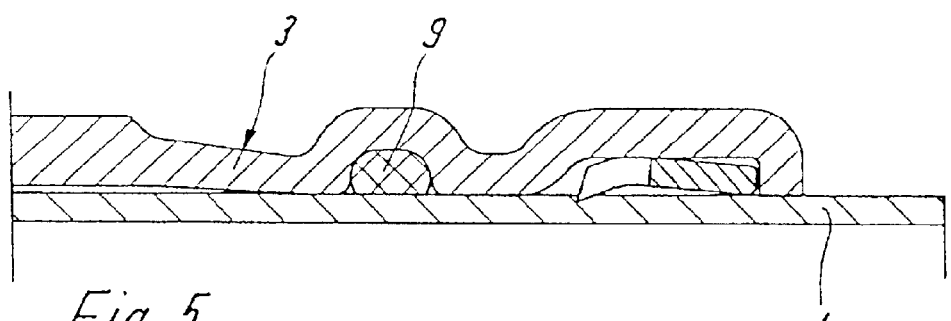
Figure 6:
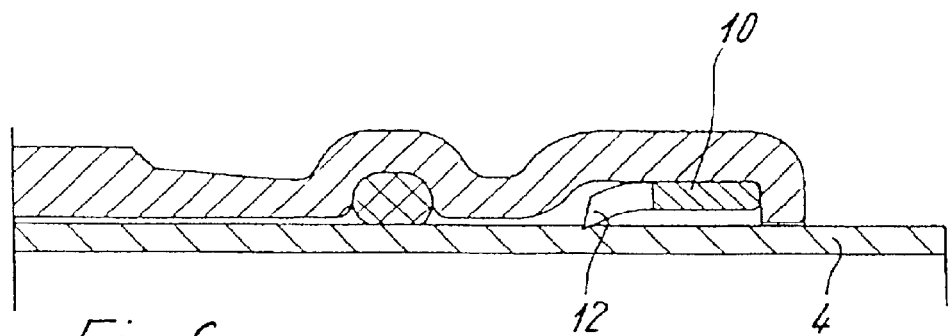

As shown in particular in FIG. 4, the projections 12 of the holding element 10 are pointed toward the outer surface area of the pipe end 4. During radial crimping operation, liquid flowing through the metal pipe 4 is kept away from the holding element 10 as a result of the interference fit of the sealing ring 9 upon the pipe end 4 whereas the projections 12 of the holding element 10 dig into the material of the pipe end 4, as shown in FIG. 3 and in particular in FIG. 5. Thus, the socket 3 of the fitting 1 is positively attached to the pipe end 4. After removing the press tool 13, a slight recoil of the cold formed fitting parts is encountered; However, during the slight recoil, the projections 12 of the holding element 10 remain entrenched in the material of the pipe end 4. The final state of the crimping operation is shown in FIG. 6.

By radially crimping the socket 3 of the fitting 1 with the inserted pipe end 4 by means of the press tool 13, a round cross section of the socket 3 is substantially retained while the particular configuration and arrangement of the holding element 10 results in same or substantially same holding forces around the circumference of the socket 3. The same is true for the sealing forces which are applied between the sealing element 9 and the pipe end 4 as a result of the radial deformation of the anchoring groove 8 during crimping operation.

Persons skilled in the art will understand that even though the press fit arrangement shown in the drawings uses only a single holding element 10, it is certainly within the scope of the invention to secure several holding elements in the receiving groove 11.

In describing the following Figures, like parts of the press fit arrangement, in particular the holding element 10 and the associated receiving groove 11, will be identified by corresponding reference numerals followed by a distinguishing lower case character.

Figure 7:
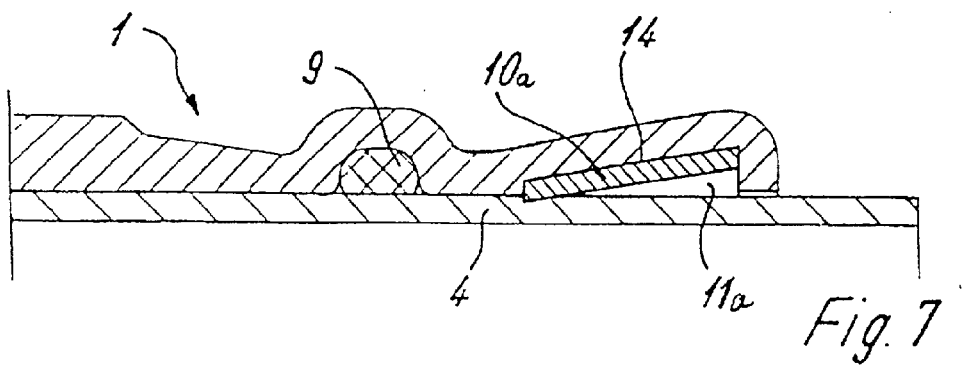
FIG. 7 is a longitudinal section of a press fit arrangement according to the present invention, showing a variation of the holding element and associated receiving groove in the socket, for realizing the non-detachable positive connection between the fitting and the metal pipe.

Turning now to FIG. 7, there is shown a longitudinal section of a modified press fit arrangement 1 which includes a holding element 10a and associated receiving groove 11a in the socket 3 for realizing the non-detachable positive connection between the fitting 1 and the pipe end 4. The holding element 10a is ring-shaped and slotted in longitudinal direction, and the receiving groove 11a is formed with a conical base 14, whereby the cross-sectional contour of the holding element 10a is matched to the contour of the base 14. The holding element 10a thus has the shape of a truncated cone, with the free edge on the end of smaller inside diameter penetrating the material of the pipe end 4 after radial crimping operation.

Figure 8:
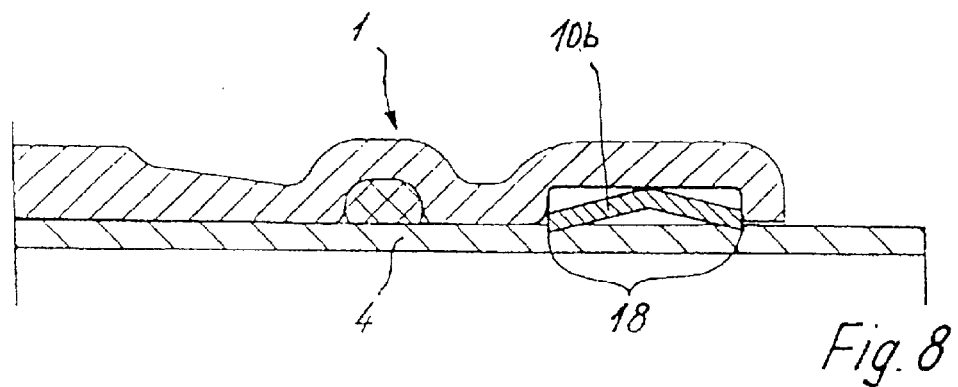
Figure 9:
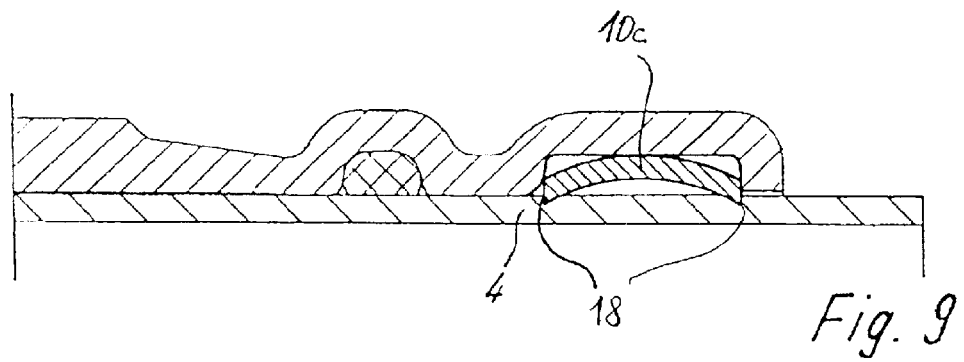
Figure 10:
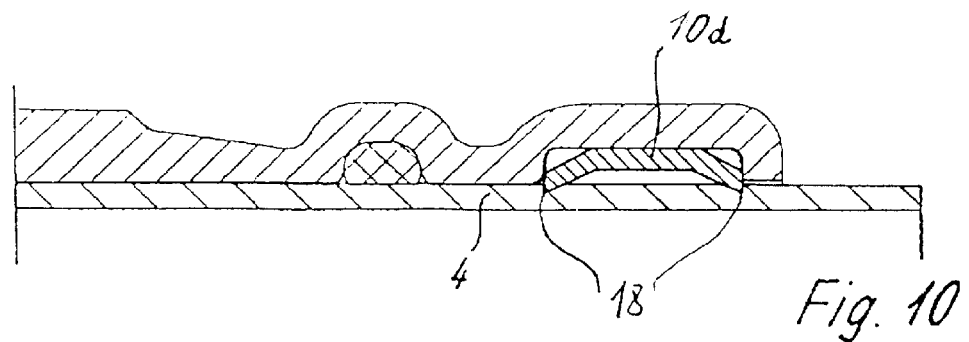

In the embodiment of the press fit arrangement of FIG. 8, the holding element 10b has a cross section in the form of a vertex of a triangle (i.e. pointed roof configuration). At radial crimping operation of the fitting 1 and the pipe end 4, the free edges 18 of the holding element 10b penetrate the material of the pipe end 4. In FIG. 9, the positive fit during crimping operation is realized in the same manner by the free edges 18 of the holding element 10c which however has an arched configuration. In FIG. 10, the holding element 10d is of polygonal configuration, with the free edges 18 penetrating the material of the pipe end 4.

FIG. 11 shows a press fit arrangement 1 in which the holding element 10e is of annular configuration and slotted in longitudinal direction. The holding element 10e is arranged in the receiving groove 11e of the socket 3 and is provided on its side distant to the sealing ring 9 with a conical surface 23. The conical surface 23 interacts with an opposite complementary conical surface 24 on the inside of the socket 3 of the fitting 1 so that the projections 12e in the form of teeth or the like on the side proximal to the sealing ring 9 penetrate the material of the pipe end 4 when the socket 3 and the pipe end 4 are pressed together. As stated above, it is certainly possible to use instead of a ring-shaped holding element, several holding elements in the form of ring segments which are arranged in the receiving groove 11e.

Turning now to FIG. 12, there is shown a longitudinal section of a further variation of a press fit arrangement 1 according to the present invention, in which the holding element 10f is of sleeve like configuration and slotted in axial direction. The socket 3 is formed with an annular receiving groove 11f which is open towards the pipe end 4 to bound with the outer peripheral surface of the pipe end 4 an annular gap 29 at the end face of the fitting 1 for passage of the holding element 10f and securement of an anchoring flange 27 inside the receiving groove 11f, with the anchoring flange 27 being formed in one-piece with the holding element 10f. The sleeve-like holding element 10 thus projects outward beyond the area of the socket 3 and surrounds the pipe end 4. When operating the press tool 13, a portion 10'f of the holding element 10f dents the material of the pipe end 4 during crimping operation, and the sealing ring 9 is squeezed between the socket 3 and the outer peripheral surface of the pipe end 4, resulting in a positive fit between the holding element 10f and the pipe end 4, as shown in FIG. 13.

In the embodiment of the press fit arrangement 1 according to FIG. 14, the socket 3 is surrounded by a holding element 10g which has a sleeve-like configuration and is slotted in longitudinal direction. The holding element 10g is also provided with an annular anchoring flange 32 which engages in the receiving groove 11g. On its side distant to the anchoring flange 32 and facing the pipe end 4, the holding element 10g is provided with teeth 31 which dig into the material of the pipe end 4 when compressing the socket 3 and the holding element 10g onto the pipe end 4, to thereby realize a positive fit between the holding element 10g and the pipe end 4.

Figure 15:
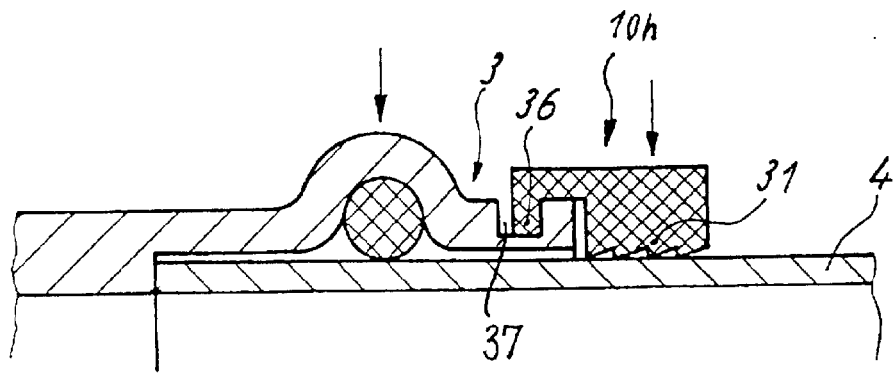

FIG. 15 shows a variation of the press fit arrangement 1 in which the holding element 10h is a sleeve slotted in longitudinal direction and formed in one piece with an inwardly directed flange ring 36 for engagement in an outwardly open receiving groove 37 of the socket 3 of the fitting 1. The holding element 10h is formed with inner teeth 31 which penetrate the material of the pipe end 4 during crimping operation for realizing a positive fit.

Figure 16:
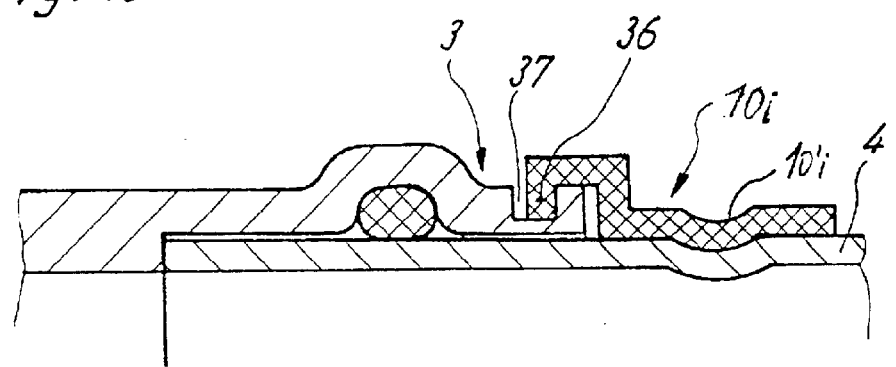

FIG. 16 shows a holding element 10i which unlike the holding element 10h is not serrated but is provided with a smooth sleeve to surround the pipe end 4, and is slotted in longitudinal direction. A crimping operation of the holding element 10i and the socket 3 with the pipe end 4 results in a common permanent deformation between a sleeve portion 10'i of the holding element 10i and the pipe end 4.

Figure 17:
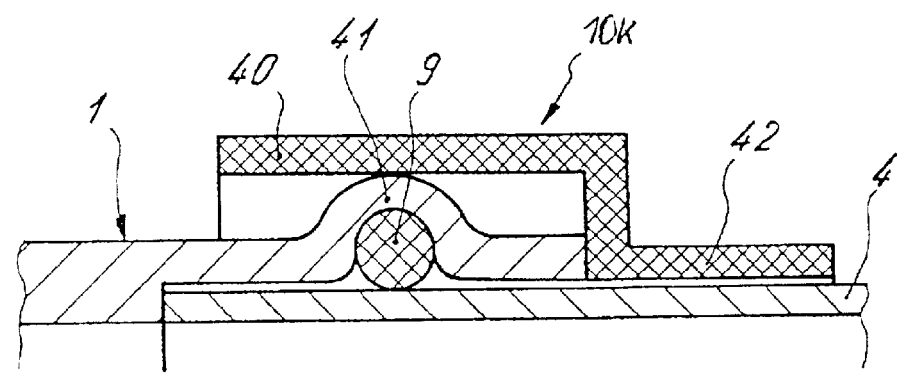
Figure 18:
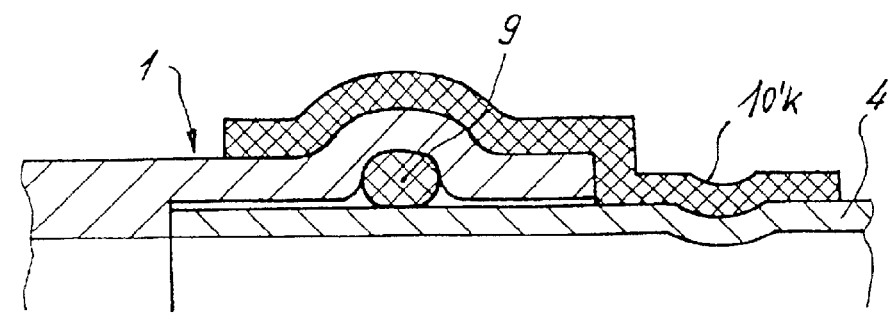

FIG. 17 shows a holding element 10k which is formed as stepped sleeve having an inward portion 40 of greater inside diameter and an outward portion 42 of smaller inside diameter. The portion 40 overlaps a bead 41 which forms interiorly the anchoring groove 8 for the sealing ring 9, whereas portion 42 surrounds the pipe end 4. After crimping the sleeve-like holding element 10k, which preferably is slotted in axial direction, with the socket 3 of the fitting 1 and the pipe end 4, the holding element 10k follows the contour of the socket 3, while a portion 10'k of the holding element 10k is compressed into the pipe end 4 to commonly deform these parts, as shown in FIG. 18.

Preferably, the holding element 10 has a hardness which exceeds the hardness of the metal pipe. Suitably, the holding element 10 is made of special steel.

Although in the preceding examples of the press fit arrangement, the holding element is generally shown at a location between the sealing ring 9 and the free end of the fitting 1 or also projecting beyond the free end of the fitting 1, it is also possible to position the holding element in a region between the stop surface 5 and the sealing ring 9. In this case, the holding element comes into contact with the liquid transported in the metal pipe so that the holding element should be made of corrosion-resistant material.

While the invention has been illustrated and described as embodied in a non-detachable press fit arrangement between a fitting and an end portion of a metal pipe, it is not intended to be limited to the details shown since various modifications and structural changes may be made without departing in any way from the spirit of the present invention.

What is claimed as new and desired to be protected by Letters Patent is set forth in the appended claims:

1. In a non-detachable press fit arrangement between an end portion of a metal pipe and a crimpable socket of a fitting, with the socket defining an interior space and being formed with an annular anchoring groove facing the interior space for receiving a sealing ring, said press fit arrangement comprising at least one holding element resiliently secured to the socket in a receiving groove and cold formed together with the socket, said holding element has a material penetrating component formed by a plurality of cutting arcuate projections pointing in the direction of the anchoring groove and whose ends penetrate the metal pipe after the socket is crimped by cold forming, and wherein the annular anchoring groove is located in front of and separate from the receiving groove relative to the pipe end.

2. The press-fit arrangement of claim 1 wherein the socket is formed adjacent the anchoring groove for the sealing ring with an annular receiving groove facing the interior space for receiving the holding element, and wherein said material penetrating component is a cutting edge arranged about the circumference of the holding element and extending to the end portion of the metal pipe.

3. The press-fit arrangement of claim 1 wherein the holding element is a ring formed with an axial slot.

4. The press-fit arrangement of claim 3 wherein the ring-shaped holding element has a cross section selected form the group consisting of vertex of a triangle, curved and polygonal.

5. The press-fit arrangement of claim 2 wherein the receiving groove has a conical base, said holding element having a cross sectional contour which complements the conical base, and including a free edge of small diameter for penetration into the end portion of the metal pipe after radially compressing the socket.

6. The press-fit arrangement of claim 2 wherein the holding element is mounted by way of a positive fit into the receiving groove.

7. The press-fit arrangement of claim 1 wherein the socket of the fitting has an outer peripheral surface formed with an engagement member selected from the group consisting of circumferential groove, lobes ribs and circumferential fins for attachment of a press tool.

8. The press-fit arrangement of claim 1 wherein the socket of the fitting is substantially round alter being compressed, with sealing forces and holding forces applied between the socket and the end portion of the metal pipe being substantially evenly distributed about the circumference of the metal pipe.

9. The press-fit arrangement of claim 2 wherein the holding element is a sleeve which is slotted in the axial direction and formed with an anchoring flange engaging in the receiving groove of the socket, said holding element traversing an annular gap formed between an end face of the fitting and the end portion of the metal pipe to extend outwards for surrounding the metal pipe, whereby through application of a press tool a portion of the holding element is capable to dent the metal pipe.

10. The press-fit arrangement of claim 9 wherein the portion of the holding element has an inner surface formed with teeth.

11. The press-fit arrangement of claim 1 wherein the socket has an end face forming an entry opening for the end portion of the metal pipe, said socket being formed in close proximity to the end face with a ring-shaped receiving groove which is open to the outside for receiving an anchoring flange of the holding element, said holding element being an axially slotted sleeve which surrounds the metal pipe and partially dents the material of the metal pipe.

12. The press-fit arrangement of claim 11 wherein the sleeve has an inner surface formed with teeth.

13. The press-fit arrangement of claim 1 wherein the anchoring groove is formed in a bead of the socket, said holding element being formed as a stepped sleeve having a first portion of smaller diameter and a second portion of greater diameter, with the second portion overlapping the bead of the socket, and with the first portion surrounding the metal pipe, wherein the holding element matches an outer contour of the socket after being compressed, with the first portion of the stepped sleeve denting the material of the metal pipe.

14. The press-fit arrangement of claim 1 wherein the holding element has a hardness exceeding a hardness of the metal pipe.

15. The press-fit arrangement of claim 1 wherein the holding element is made of special steel.

16. The press-fit arrangement of claim 1 wherein the sealing ring is a seal selected from the group consisting of lip seal, O ring or matched formed part.

17. The press-fit arrangement of claim 1 wherein the sealing ring has a relatively small cross section.

18. The press fit arrangement of claim 1, wherein the interior space of the socket includes a shoulder, which limits the amount of insertion of the pipe end, and the anchoring groove is between the shoulder and the receiving groove and spaced from the shoulder.

19. The press fit arrangement of claim 1, wherein the receiving groove includes two opposed walls, one of the walls limiting axial movement of the holding element away from the anchoring groove before insertion of the pipe end into the socket.

20. The press fit arrangement of claim 1, wherein the projections form one end of the holding element.

21. The press fit arrangement of claim 1, wherein the socket is dimensioned to receive pipes having an insider diameter of greater than 54 millimeters.

* * * * *